United States Patent [19]

Morrison

[11] Patent Number: 4,902,450
[45] Date of Patent: Feb. 20, 1990

[54] MULTI-ELEMENT SPHERICAL SHELL GENERATION

[75] Inventor: Andrew D. Morrison, Altadena, Calif.

[73] Assignee: The United States of America as represented by the Administrator of the National Aeronautics and Space Administration, Washington, D.C.

[21] Appl. No.: 250,195

[22] Filed: Sep. 28, 1988

[51] Int. Cl.[4] .................................................. B29B 9/10
[52] U.S. Cl. ........................................... 264/4; 425/5; 425/6; 425/804
[58] Field of Search .......................... 264/4, 5, 6, 7, 13, 264/9; 425/5, 6, 804; 65/21.4, 21.1

[56] References Cited

U.S. PATENT DOCUMENTS 2,339,114  1/1944  Scherer ..................................... 264/4

Primary Examiner—Jan H. Silbaugh
Assistant Examiner—Mary Lynn Fertig
Attorney, Agent, or Firm—Thomas H. Jones; John R. Manning; Charles E. B. Glenn

[57] ABSTRACT

A nozzle assembly in a multi-element spherical shell generation system includes first and second side-by-side spaced apart nozzles and a web portion extending between and connecting the nozzles. The first nozzle has an inner orifice adapted to discharge a first filler material and an outer annular orifice separated from and defined in concentric relation about the inner orifice and adapted to discharge a first shell material. The second nozzle has an inner orifice adapted to discharge a second filler material and an outer annular orifice separated from and defined in concentric relation about the inner orifice and adapted to discharge a second shell material. A multi-element spherical shell can be formed through employment of the nozzle assembly by merger with one another after discharge from the outer orifices of the nozzles of a pair of adjacent annular streams of liquid or molten shell wall material of different compositions and encapsulation by the mixed shell wall materials of a common encapsulated core fluids also simultaneously discharged by the inner orifices nozzles. On the other hand, the pair of encapsulating streams of shell wall material can be of the same material which merge together and encapsulate core fluids of different compositions which will merge together after discharge from the nozzles.

16 Claims, 1 Drawing Sheet

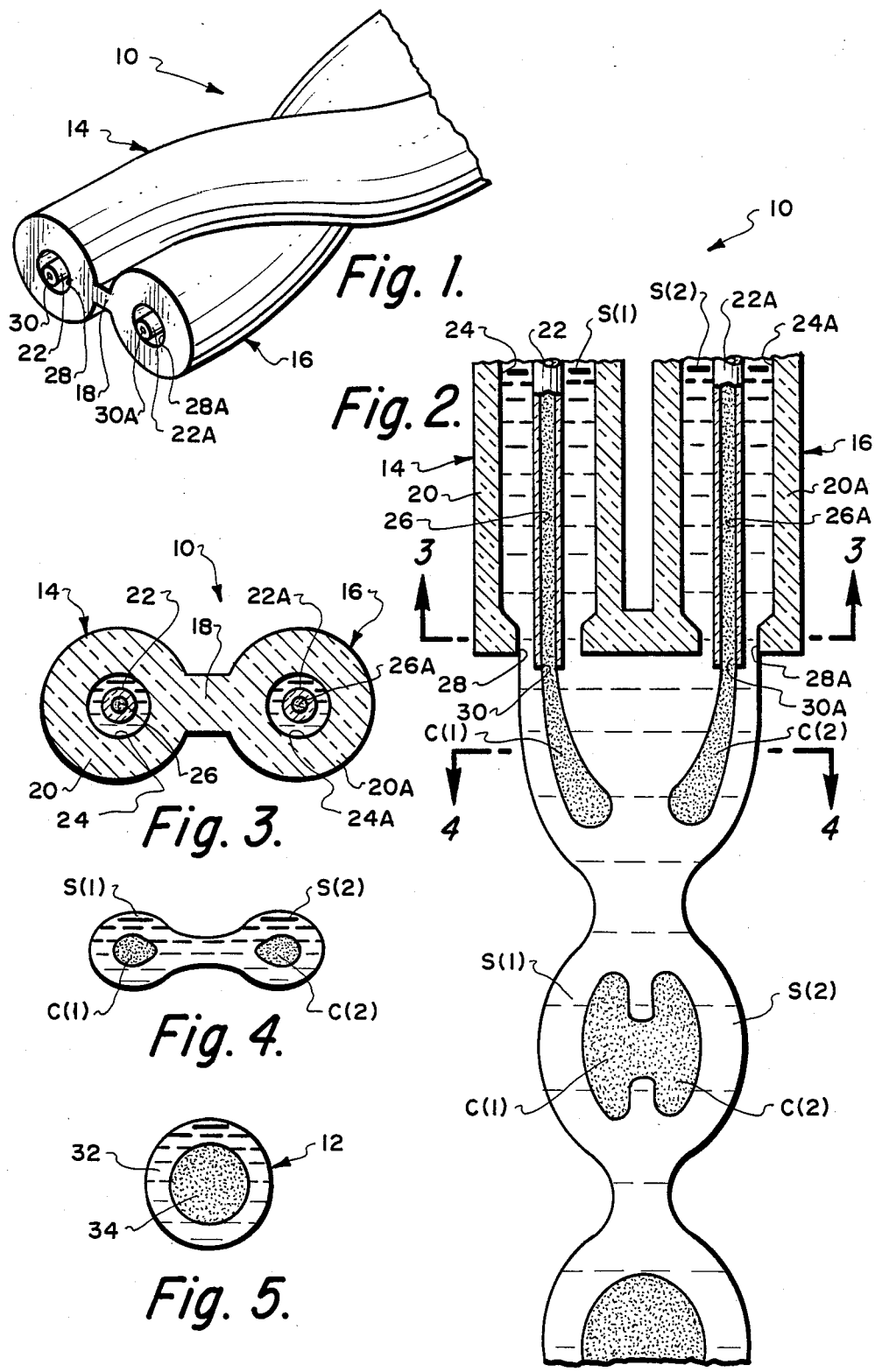

MULTI-ELEMENT SPHERICAL SHELL GENERATION

ORIGIN OF THE INVENTION

The invention described herein was made in the performance of work under a NASA contract, and is subject to the provisions of Public Law 96-517 (35 USC 202) in which the contractor has elected not to retain title.

BACKGROUND OF THE INVENTION

The present invention relates to fluid-filled spherical shell generation and, more particularly, is concerned with multi-element spherical shell generation.

Fluid-filled spherical shells of material have been produced based on the phenomena of liquid jet flow instability and breakup. Materials which have been used for forming the shells include glasses, met-glasses, metals and plastics. Typical shell forming apparatuses are disclosed in U.S. Pat. Nos. to Mabbs (2,333,433 and 2,379,817) Frosch et al (4,279,632), Morishita et al (4,422,985 and 4,481,157), Kendall et al (4,643,854) and Wang et al (4,645,442).

For producing shells of 750 micrometer and greater diameter, one technique commonly employed is disclosed in U.S. Pat. No. 4,643,854 to Kendall et al cited above. The technique consists of pushing or forcing a stream of molten shell material, such as by gravity flow, through an outer one of a pair of concentric annular passages of a nozzle while flowing a continuous stream of a pressurized filler fluid, gas or liquid, through an inner one of the nozzle passages. When the velocities of concentric flows are in the proper range of values, a hollow jet instability occurs causing pinch-off of the jet, encapsulation of the filler fluid, and, due to surface tension, the formation of spherical shells.

Spherical shells of 750 micrometer or more in diameter are successfully produced in the apparatus of the Kendall et al patent by employing a filler material supply tube which extends through the shell material reservoir to the outlet nozzle and from which discrete bubbles of filler fluid are pushed into and entrained in the existing stream of molten shell material. The bubbles cause the fluid jet to form nodes and subsequently to break-up into shells due to the classical Rayleigh-Taylor instability phenomenon.

Solidification of the spherical shells is brought about typically by freezing of the molten shell material as the shells fall through a conventional cooling arrangement. Depending upon the material system selected, solidification can also occur by using alternative techniques, for example, by using a chemical process. The final shape of the solid spherical shell is a result of centering forces, surface tension, and aerodynamical and gravitational forces acting on the falling bubble and on its cooling rate. The reproducibility and precision of the product is frequently within a few percent.

Notwithstanding the overall effectiveness and success of the above-described technique in forming fluid-filled spherical shells, a need exists for improvement thereof so as to allow more versatility in the encapsulated and encapsulating materials composing the fluid-filled shells.

SUMMARY OF THE INVENTION

The present invention provides improvements in spherical shell generation designed to satisfy the aforementioned needs. In particular, a spherical shell generation system is provided with an improved nozzle assembly which facilitates generation of multi-element shells. The improved nozzle assembly is in the form of two double-walled annular nozzles interconnected by a web or bridge portion. The bridge portion extending between the nozzles causes the individual streams to become coupled together and combine into a single stream.

Each nozzle can deliver different liquids and different gases in many combinations. The timing of the mixing and solidification processes will determine the character of the final product. Spherical shells can thus be generated with any of the following compositions: "two yolks", e.g., two shell filling materials as separate phase inclusions in a spherical shell wall; post-mixed inclusions, e.g., two shell filling materials which combine to mix or react in a spherical shell wall only after leaving the shell generating nozzle assembly; or shell wall materials which combine to mix or react only after leaving the nozzle assembly.

Accordingly, the present invention is directed to a nozzle assembly in a multi-element spherical shell generation system. The nozzle assembly comprises: (a) a first nozzle having an inner orifice adapted to discharge a first filler material and an outer annular orifice separated from and defined in concentric relation about the inner orifice and adapted to discharge a first shell material; (b) a second nozzle having an inner orifice adapted to discharge a second filler material and an outer annular orifice separated from and defined in concentric relation about the inner orifice and adapted to discharge a second shell material; and (c) a web portion extending between and connecting the first and second nozzles adjacent the respective outer orifices thereof so as to provide an interconnecting bridge therebetween.

Further, the first nozzle of the nozzle assembly has an inner passage which communicates with the inner orifice of the first nozzle and is adapted to supply the first filler material thereto. Also, the first nozzle has an outer annular passage separated from and defined in concentric relation about from the inner passage of the first nozzle. The outer passage communicates with the outer orifice of the first nozzle and is adapted to supply the first shell material thereto.

Still further, the second nozzle of the nozzle assembly has an inner passage which communicates with the inner orifice of the second nozzle and is adapted to supply the second filler material thereto. Also, the second nozzle has an outer annular passage separated from and defined in concentric relation about from the inner passage of the second nozzle. The outer passage communicating with the outer orifice of the second nozzle and is adapted to supply the second shell material thereto.

The present invention is also directed to a multielement spherical shell generation method comprising the steps of: (a) discharging a pair of annular outer streams of first and second fluid materials; (b) coalescing the annular outer streams such that they merge with one another after discharge from the outer orifices to generate a shell wall; (c) discharging a pair of inner streams of first and second fluid materials such that they are encapsulated by the annular outer streams upon discharge; and optimally or later (d) coalescing the inner streams such that they merge with one another for generating a core within the shell wall.

More particularly, the annular outer streams are discharged from a pair of outer nozzle orifices and the inner streams are discharged from a pair of inner nozzle orifices concentrically surrounded by the respective outer orifices. Further, the first and second materials of the annular outer streams can be molten materials having either the same or different compositions. Similarly the first and second materials of inner streams can be liquids or gases having either the same or different compositions.

These and other advantages and attainments of the present invention will become apparent to those skilled in the art upon a reading of the following detailed description when taken in conjunction with the drawings wherein there is shown and described an illustrative embodiment of the present invention.

BRIEF DESCRIPTION OF THE DRAWINGS

In the course of the following detailed description, reference will be made to the attached drawings in which:

FIG. 1 is a view of elevation of a nozzle assembly for use in generating multi-element spherical shells.

FIG. 2 is a sectional view of a further embodiment of a nozzle assembly showing generation of a multi-element shell.

FIG. 3 is an enlarged view in section taken along line 3—3 of FIG. 2.

FIG. 4 is an enlarged view of a partially formed multi-element shell taken along line 4—4 of FIG. 1 transverse to the direction of flow of the materials composing the shell as they emerge from the nozzle assembly.

FIG. 5 is a view in section of a completed shell encapsulating a single core inclusion.

DETAILED DESCRIPTION OF THE INVENTION

Referring to FIGS. 1, 2 and 3 of the drawings, there is shown an improved nozzle assembly, generally designated by the numeral 10 and constituting the preferred embodiment of the present invention. The nozzle assembly 10 adapts a shell generation system (not shown in its entirety) to produce multi-element shells 12. Basically, the nozzle assembly 10 includes separate first and second nozzles 14, 16 positioned side-by-side in spaced relation and a web portion 18 extending between and providing a connecting bridge therebetween. The nozzles are angularly directed such that they regularly impinge at a common point to form a common coherent stream. The two streams are joined by surface tension to a common web or wall of liquid. Instability or vibration causes pinch-off of the stream into discrete spherical shells. The nozzles are angularly directed such that they singularly impinge at a common point to form a common coherent stream. The two streams are joined by surface tension to a common web or wall of liquid. Instability or vibration causes pinch-off of the stream into discrete spherical shells. The remainder of the shell generation system employed with the first and second nozzles 14, 16 may take the form of a pair of the systems as described and illustrated in above-cited U.S. Pat. No. 4,643,854 to Kendall, Jr. et al. The disclosure of Kendall, Jr. et al patent with respect to the components and operation of the system illustrated therein is incorporated herein by reference.

More particularly, the first nozzle 14 of the nozzle assembly 10 includes an outer cylindrical wall 20 and an inner cylindrical wall or tube 22 disposed concentrically within and spaced inwardly from the outer wall 20. An outer passage 24 is defined in the first nozzle 14 between the outer wall 20 and inner tube 22 thereof. An inner passage 26 is defined in first nozzle 14 by and axially through the inner tube 22 thereof so as to be separated from the outer passage by the inner tube 22. An outer orifice 28 is defined in the first nozzle 14 between the outer ends of the outer wall 20 and the inner tube 22. An inner orifice 30 is defined in first nozzle 14 by the outer end of the inner tube 22 so as to be separated from the outer orifice 28 by the inner tube end.

The inner passage 26 which communicates with the inner orifice 30 is adapted to supply it with a first filler material. The inner orifice 30 is adapted to discharge the first filler or core material C(1) into a stream thereof. The outer outer annular passage 24 separated from and defined in concentric relation about the inner passage 26 communicates with the outer annular orifice 28 to supply it with a first shell wall material S(1). The outer annular orifice 28 separated from and defined in concentric relation about the inner orifice 30 is adapted to discharge the first shell wall material S(1) into a stream thereof which surrounds and encapsulates the stream of first filler material C(1) discharging from the inner orifice 30.

The second nozzle 16 of the nozzle assembly 10 has a construction which is substantially identical to that of the first nozzle 14. Thus, its components need not be described in detail. Suffice it to point out that the corresponding components of the second nozzle 16 are identified by the same reference numeral with the suffix "A" added. The inner orifice 30A of the second nozzle 16 is adapted to discharge in a stream a second filler or core material C(2) being supplied thereto by the inner passage 26A of the second nozzle. The outer annular orifice 28A of the second nozzle 16 is adapted to discharge in a stream which encapsulates the second filler material C(2) a second shell material S(2) being supplied thereto by the outer passage 24A.

As mentioned above, the web portion 18 of the nozzle assembly 10 extends between and connects the first and second nozzles 14, 16. Specifically, the web portion 18 is disposed adjacent to respective outer orifices 28, 28A at the outer ends of the outer walls 20, 20A of the nozzles 14, 16 so as to provide the interconnecting bridge therebetween.

The nozzle assembly 10 is employed to generate the multi-element spherical shells 12. To generate the shells 12, a pair of annular outer streams of the first and second fluid shell materials S(1), S(2) are discharged from the respective outer orifices 28, 28A of the first and second nozzles 14, 16. The side-by-side spaced relationship in which the first and second nozzles 14, 16 are disposed by the web portion 18 promotes bridging between and coalescing of these streams after discharge from the outer annular orifices 28, 28A such that the streams merge with one another to generate a shell wall 32 of the multi-element spherical shell 12.

Concurrently, a pair of inner streams of the first and second fluid filler or core materials C(1), C(2) are discharged from the respective inner orifices 30, 30A of the first and second nozzles 14, 16. Because of the concentric relationship of the outer orifices 28, 28A about the inner orifices 30, 30A, the inner streams of core materials C(1), C(2) are encapsulated upon discharge by the annular outer streams of shell wall materials S(1), S(2). After discharge and with coalescing of the outer streams of shell wall materials S(1), S(2), the inner streams of filler or core materials C(1), C(2) may also coalesce such that they merge with one another to generate a core 34 for the shell 12 within the shell wall 32 thereof.

Almost any set of materials can be used for the shell and core materials S(1), S(2) and C(1), C(2). For example, the shell materials S(1), S(2) of the annular outer streams can have the same or different compositions. They can be either non-reactive or materials which react such as two component polymers or monomer and catalyst. They are preferably molten materials which solidify after discharge. By way of another example, the filler or core materials C(1), C(2) of the inner streams can have the same or different compositions. They can also react to form an encapsulated material formed in situ within the shell wall. By use of the pair of double-walled nozzles 14, 16 in the side-by-side relationship defined by the web portion 18, the core materials C(1), C(2) are disposed sufficiently close so that they form a common bridge and coalesce. The core materials C(1) and C(2) can each be immiscible with the shell material and can form two discrete spherical inclusions. The two materials can be co-reactive and can (stored under conditions preventing reaction such as an inert atmosphere and/or low temperature) later be mixed by mechanical forces such as by pressure on the shell or by heat to soften or melt the shell material or by diffusing a catalyst of the core materials through the shell.

FIG. 4 shows the configuration of the streams as they discharge from their respective orifices. Note the dog-bone or bar-bell structure thereof which eventually coalesces or collapses into a single bubble and shell structure as seen in FIG. 5. It will be understood that the shell filler materials in the inner streams thereof can only combine and react after leaving the nozzles. The same is true in the case of the shell wall materials in the outer streams thereof. Thus, each nozzle can deliver different liquids and different gases in many combinations. The timing of the mixing and solidification processes will determine the character of the final product.

Spherical shells of glasses, met-glasses, metals and plastics are being produced at the Jet Propulsion Laboratory using a method based on the phenomena of liquid jet flow instability and breakup as disclosed in the Kendall patent. For shells 750 micrometer and greater diameter, the process consists of pushing a stream of molten shell material through the outer of two annular nozzle passages while flowing a continuous stream of filler fluid, gas or liquid, through the inner passage of the nozzle. When the flows are in the right range of values, a hollow jet instability occurs causing pinch-off of the jet, encapsulation of the filler fluid, and, due to surface tension, the formation of the spherical shells. Shells 750 micrometer in diameter or more are successfully produced by employing a system design in which the filler material are pushed into and entrained in the existing stream of molten shell material. The bubbles cause the fluid jet to form nodes and subsequently to break-up into shells due to the more classical Rayleigh-Taylor instability phenomenon. Solidification occurs by freezing of the molten shell material, but could, depending on the material system selected, occur by a chemical process. The final shape of the solid shell is a result of centering forces, surface tension, and aerodynamical and gravitational forces acting on the falling bubble and on its cooling rate. The reproducibility and precision of the product is frequently within a few percent.

The present invention couples two streams of fluid flowing from separate nozzles by surface tension across a liquid 'bridge' between the two streams. The resulting dog-bone cross-section stream eventually collapses to a single stream and breaks up into droplets due to the above-described instabilities.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinabove described being merely a preferred or exemplary embodiment thereof.

Having thus described the invention, what is claimed is:

1. In a multi-element spherical shell generation system, a nozzle assembly comprising:

(a) a first nozzle having an inner orifice adapted to discharge a first filler material in a first inner stream and an outer annular orifice separated from and defined in concentric relation about said inner orifice and adapted to discharge a first shell material in a first annular outer stream, said first nozzle including an outer cylindrical wall and an inner cylindrical tube disposed concentrically within and spaced inwardly from said outer wall, said outer orifice of said first nozzle being defined between outer ends of said outer wall and inner tube and said inner orifice of said first nozzle being defined by said outer end of said inner tube;

(b) a second nozzle having an inner orifice adapted to discharge a second filler material in a second inner stream and an outer annular orifice separated from and defined in concentric relation about said inner orifice and adapted to discharge a second shell material in a second annular outer stream, said second nozzle including an outer cylindrical wall and an inner cylindrical tube disposed concentrically within and spaced inwardly from said outer wall, said outer orifice of said second nozzle being defined between outer ends of said outer wall and inner tube and said inner orifice of said second nozzle being defined by said outer end of said inner tube; and (c) a web portion extending between and rigidly interconnecting said first and second nozzles adjacent said respective outer orifices at said outer ends of said outer walls thereof so as to provide an outer end bridge extending between said outer orifices which causes said first and second outer streams of said first and second shell materials to couple together and combine into a single stream for subsequently generating a single shell wall which, in turn, causes said first and second inner streams to coalesce and form a pair of discrete core inclusions for subequently generating a single core inclusion within the single shell wall.

2. The nozzle assembly of claim 1, wherein said first nozzle has an inner passage which communicates with said inner orifice of said first nozzle and is adapted to supply the first filler material thereto.

3. The nozzle assembly of claim 2, wherein said first nozzle has an outer annular passage separated from and defined in concentric relation about from said inner passage of said first nozzle, said outer passage communicating with said outer orifice of said first nozzle and adapted to supply the first shell material thereto.

4. The nozzle assembly of claim 3, wherein said outer passage of said first nozzle is defined between said outer wall and inner tube, and said inner passage of said first nozzle is defined within said inner tube.

5. The nozzle assembly of claim 1, wherein said second nozzle has an inner passage which communicates with said inner orifice of said second nozzle and is adapted to supply the second filler material thereto.

6. The nozzle assembly of claim 5, wherein said second nozzle has an outer annular passage separated from and defined in concentric relation about from said inner passage of said second nozzle, said outer passage communicating with said outer orifice of said second nozzle and adapted to supply the second shell material thereto.

7. The nozzle assembly of claim 6, wherein said outer passage of said second nozzle is defined between said outer wall and inner tube, and said inner passage of said second nozzle is defined within said inner tube.

8. A multi-element spherical shell generation method, comprising the steps of:
   (a) discharging a pair of annular outer streams of first and second fluid materials;
   (b) coalescing said annular outer streams such that they merge with one another after discharge from the outer orifices to generate a shell wall;
   (c) discharging a pair of inner streams of first and second fluid materials such that they are encapsulated by said annular outer streams upon discharge;
   (d) coalescing said inner streams such that they generate two discrete core inclusions within the shell wall; and
   (e) merging the two discrete core inclusions into a single inclusion within the shell.

9. The method of claim 8 wherein said annular outer streams are discharged from a pair of outer nozzle orifices and said inner streams are discharged from a pair of inner nozzle orifices concentrically surrounded by the respective outer orifices.

10. The method of claim 8 wherein said first and second materials of said annular outer streams have different compositions.

11. The method of claim 10 wherein said first and second materials of said annular outer streams are molten materials.

12. The method of claim 8 wherein said first and second materials of said annular outer streams are the same.

13. The method of claim 8 wherein said first and second materials of said inner streams are the same fluid.

14. The method of claim 8 wherein said first and second materials of said inner streams are fluids of different compositions.

15. The method according to claim 8 in which the merger occurs during formation of the shell wall.

16. The method according to claim 8 in which the merger occurs after formation of the shell wall.

* * * * *